Patented Nov. 15, 1927.

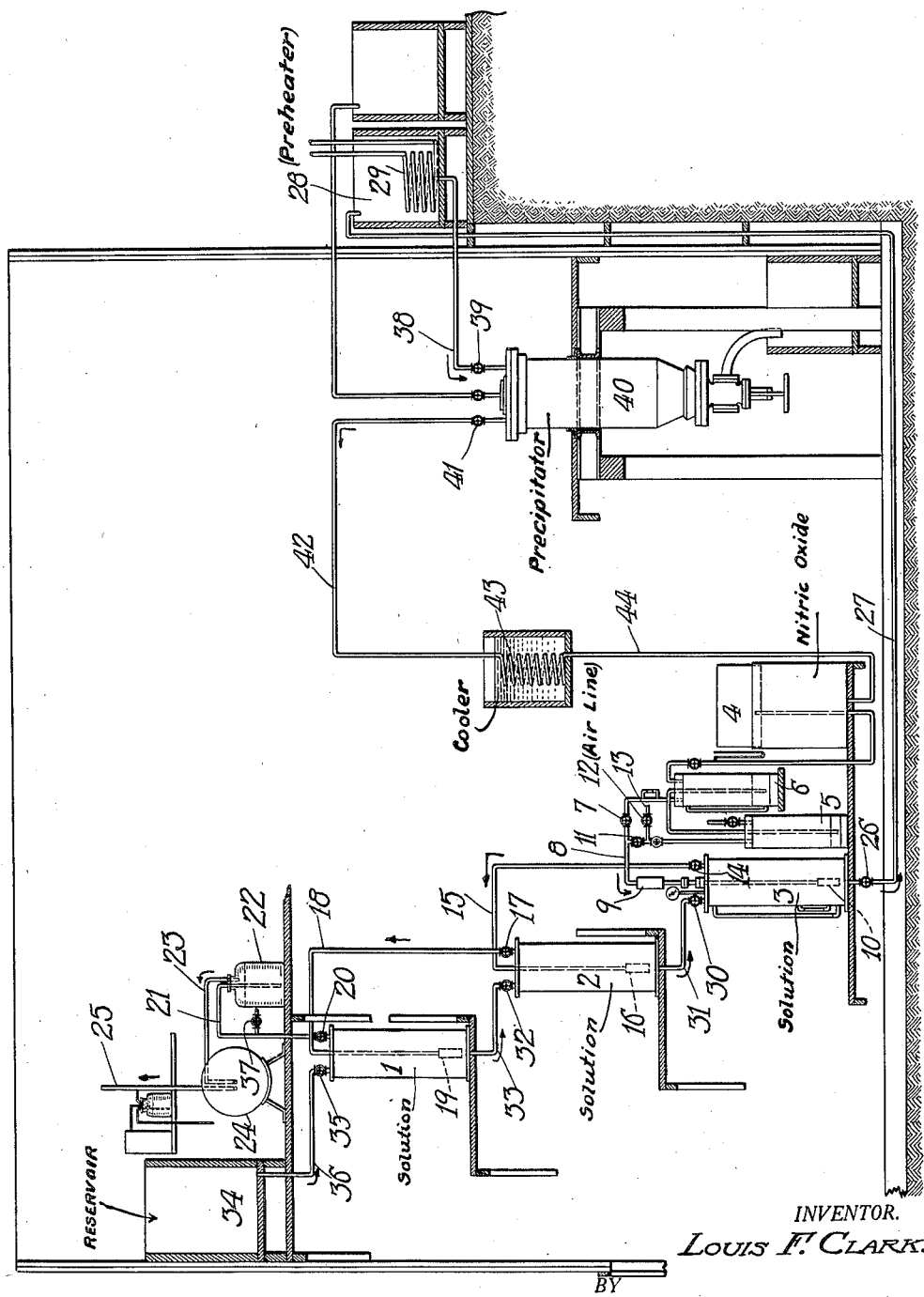

1,649,152

UNITED STATES PATENT OFFICE.

LOUIS F. CLARK, OF POTRERILLOS, CHILE.

OXIDIZING METALLIC SOLUTIONS.

Application filed November 2, 1922. Serial No. 598,479.

In a previous application No. 482,018 filed July 2, 1921, which has matured into Patent No. 1,503,229 I have described a method of treating solutions of copper and other metals to remove impurities therefrom by subjecting the solutions to heat and to pressure, and in this connection I have described a preliminary oxidizing of solutions which facilitates the process.

In said application the oxidizing system or method is claimed only in connection with the purifying operations described. The present invention is in part a continuation of the aforesaid application and is directed to the oxidizing system separately or in combination with various other purifying operations; the oxidizing system being described more in detail than in the previous application. For the removal of impurities either by the higher temperature and pressure method previously described or by other methods a preliminary oxidizing of the solution is very advantageous.

I subject the solution to the action of an oxidant such as oxygen or air in the presence of a catalyst, such as nitric oxide (NO). The nitric oxide is injected under pressure into the metallic solution, where it acts as a catalyzer to aid the oxidizing operation, and can be recovered almost totally at the end of the oxidizing process. The process is preferably a continuous cyclic operation, the nitric oxide being regenerated and stored and re-used.

An advantage of the process is that the oxidizing operation may be conducted at the room temperature, that is at ordinary temperatures without heating the solution.

It has been found in practice that ferrous iron, arsenous arsenic and other metallic impurities found in industrial solutions such as are obtained in leaching operations on concentrates and other materials containing copper, zinc, aluminum and other metals can be advantageously oxidized by my present method.

It has been found that the best effects are obtained when the nitric oxide gas is injected into the solution through a porous medium, such for example as a thin walled alundum tube, which gives a fine dispersion of the gas and a nearly complete dissolving thereof. Also the injection of the oxygen or air into the solution through the same or a similar porous medium to effect the oxidation brings similar beneficial results. Generally the operation can be carried on at room temperatures, as above stated, but when the porous medium is not used it may be necessary for the best results to heat the solution in order to aid the elimination of the dissolved nitric oxide within a reasonable time, and without the porous medium the oxidation is less good.

The accompanying drawing is a diagrammatic elevation of the tanks, piping and accessories of a plant in which the process may be applied. It will be understood, however, that the process may be applied with various other styles or arrangements of apparatus.

Referring to the drawing, suppose the tanks 1, 2 and 3 each to be about three-quarters full of the solution to be treated. Nitric oxide (NO) as nearly pure as possible is stored in a gasometer 4. A pair of tanks 5 and 6 constitute simply a sort of pump operated by changes in the water level to cause the nitric oxide gas to flow from the storage tank 4 and to force it through the open valve 7 and the pipe 8 and meter 9 into the porous tube 10 and thence into the solution in the tank 3. Some oxidation of the solution may take place during this process due to impurities, such as $NO_2$, in the gas, but this gas is used chiefly as a catalyst and not as an oxidant. Approximately one gram of nitric oxide is injected in this way per liter of solution in tank 3, if we assume that twenty grams of iron per liter are to be oxidized. The valve 7 is then closed and the stop valve 11 and the reducing valve 12 in the air line 13 are opened, whereupon air under proper pressure passes through the pipe 8 and porous tube 10 into the solution. Oxygen may be used instead of air, but it is generally cheaper to use the latter.

The nitric oxide dissolved in the solution activates the oxygen of the air so that the iron is readily oxidized. Some of the nitric oxide is converted into nitric acid and remains in the solution. The greater part of the oxide, however, is converted into $NO_2$ and carried out with the continued admission of air and passes with the excess of air through valve 14 and pipe 15 to the bottom of the solution in the tank 2. It is preferably sprayed into the solution through a perforated nozzle 16 at the lower end of the pipe.

Part of the iron in the tank 2 is oxidized by the $NO_2$ and excess of air introduced. Thus a large portion of the $NO_2$ is reduced to nitric oxide (NO) and maintained in the solution by the excess of ferrous iron therein. A certain percentage of the gas is also converted to nitric acid and retained in the solution in this form. The portion of the gas not retained passes, with the excess of air admitted, through the valve 17 and pipe 18 into the bottom of the solution in the tank 1 through a spray nozzle 19. In this tank 1 again some oxidation takes place and some formation of nitric acid, and the greater part of the remaining nitric oxide (NO) is held in solution by the excess of ferrous iron.

All the nitric oxide not thus retained passes out with the remaining excess of air and may be accepted as the loss of the system; though it may be collected by passing through a valve 20 and pipe 21 and through a porous medium into an alkaline solution in the carboy 22; the exhaust air being carried from the carboy through a pipe 23 to a rotary motor 24 which measures its volume; and being then discharged through a pipe 25.

When the solution in the tank 3 has been oxidized the valve 14 is closed and the solution forced out by air pressure entering through the pipe 8; the valve 26 being opened so that the solution passes through the pipe 27 into a preheater tank 28 in which is a steam coil 29. When the solution in the tank 3 has been discharged the air valves 11 and 12 are closed, and then the valve 26.

The tank 3 is now ready for a new charge, which is brought from the tank 2 by opening the valve 30 in the communicating pipe 31 and by opening the valve 14 in the pipe 15. This permits the solution in the tank 2 to run by gravity into the tank 3, the air dispersed in the latter tank passing into the former one. In the same way solution from the tank 1 is passed into the tank 2 by opening the valve 32 in the communicating pipe 33 and by opening the valve 17 to permit the air from the tank 2 to pass through the pipe 18 into the tank 1. A new charge is then brought from a reservoir or feed tank 34 by opening a valve 35 in the communicating pipe 36. The air dispersed in the tank 1 escapes through the valve 20 and through a valve 37 in a pipe branching off from the pipe 21.

In the solution passed from the tank 2 into the tank 3 we distinguish between the NO fixed as nitric acid or nitrous acid and that which is maintained in the solution as NO, which we call "free" nitric oxide (NO). Frequently it is necessary at this stage to increase the content of free NO in the solution. This may be done by injection of the gas through the porous tube 10 as first described, after which air is injected as before and the operation repeated. A certain portion of the nitric oxide used in these operations becomes fixed as nitric acid and as such passes with the solution into the preheater tank 28. Here the solution is heated somewhat and is then passed through the pipe 38 and valve 39 into the precipitator 40.

In the precipitator 40 the solution is heated to a high temperature. In the oxidation process, taking for example a solution containing 20 grams of iron per liter, we assume the formation of 0.5 to 1.00 gram of nitric acid per liter. Sufficient ferrous iron should be left in the solution that when it is heated in the precipitating tank 40 the small quantity of nitric acid present will be decomposed, oxidizing more of the iron. Thus an additional quantity of nitric oxide gas will be generated and will be expelled through valve 41 and pipe 42; passing through a cooling coil 43 submerged in a cooling medium and thence through a pipe 44 to the gasometer 4. Thus the catalyst is regenerated and re-used in cyclic operation.

The portion of nitric oxide lost from the system and escaping with the excess of air may be replaced in a variety of ways. For example, a charge of nitric acid or of a nitric-acid-yielding compound such as sodium or other alkaline nitrate may be added to the charge in the oxidizing tank 3 or in the precipitator 40. The quantity of such additions required is slight. For example, it will suffice to use about 0.02 pounds of sodium nitrate ($NaNO_3$) per pound of oxidized iron; whereas if the sodium nitrate were used for direct oxidation there would be required about 0.5 pounds of the nitrate, per pound of iron.

The volume of air required is comparatively small, being from 2 to 4 times the theoretical volume. On the other hand, without the catalytic aid of the oxides of nitrogen the volume of air required to oxidize the iron would be about 1200 times the theoretical volume.

I have described the invention as applied to a process for the removal of iron from copper solutions. It will be understood, however, that it is applicable in the removal of other metallic impurities and to the removal of such impurities from other solutions. My previous application cites a number of examples of processes to which the present invention may be applied.

In referring to metallic solutions I include aqueous solutions of minerals generally or aqueous solutions of metals or non-metals existing as dissolved salts.

It is difficult in practice to maintain a gas storage of pure nitric oxide (NO), some $NO_2$ always being present. Where nitric oxide is referred to therefore, essentially or substantially pure NO is to be understood.

Although I have described with great particularity a process embodying the invention, yet it is not to be understood therefrom that the invention is restricted to the particular embodiment thereof disclosed. Various modifications in the phases of the process and in the order of the steps may be made and the invention may be used alone or in connection with various processes other than those described without departing from the invention as substanttially set forth in the following claims.

What I claim is:

1. The method of treating metallic solutions containing metallic impurities preliminarily to the removal of the impurities which comprises injecting an oxidant and nitric oxid (NO) into a tank containing such a solution, a part of the nitric oxid being thereby converted into $NO_2$, and a part of it being retained in the solution, and passing the mixture of gases from the first tank through a second tank of the solution.

2. The method of treating metallic solutions containing metallic impurities preliminarily to the removal of the impurities which comprises injecting an oxidant and nitric oxid (NO) into a tank containing such a solution, a part of the nitric oxid being thereby converted into $NO_2$, and a part of it being retained in the solution, and passing the mixture of gases from the first tank through a second tank of the solution, repeating this operation in successive tanks until the greater part of the nitric oxid (NO) is held in solution and regenerating nitric oxid (NO) from the gases passing out of the last tank.

In witness whereof, I have hereunto signed my name.

LOUIS F. CLARK.